Patented Oct. 8, 1935

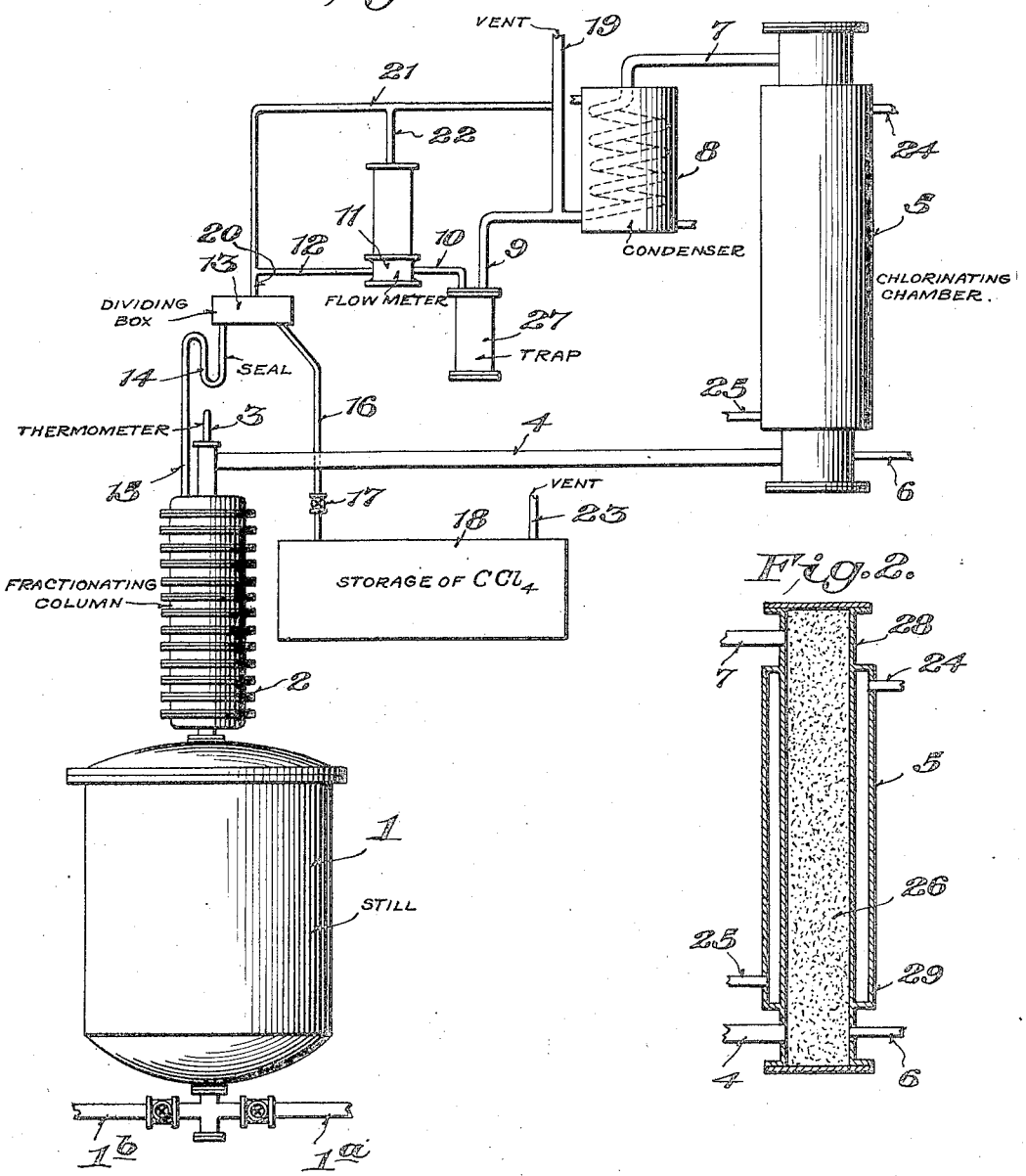

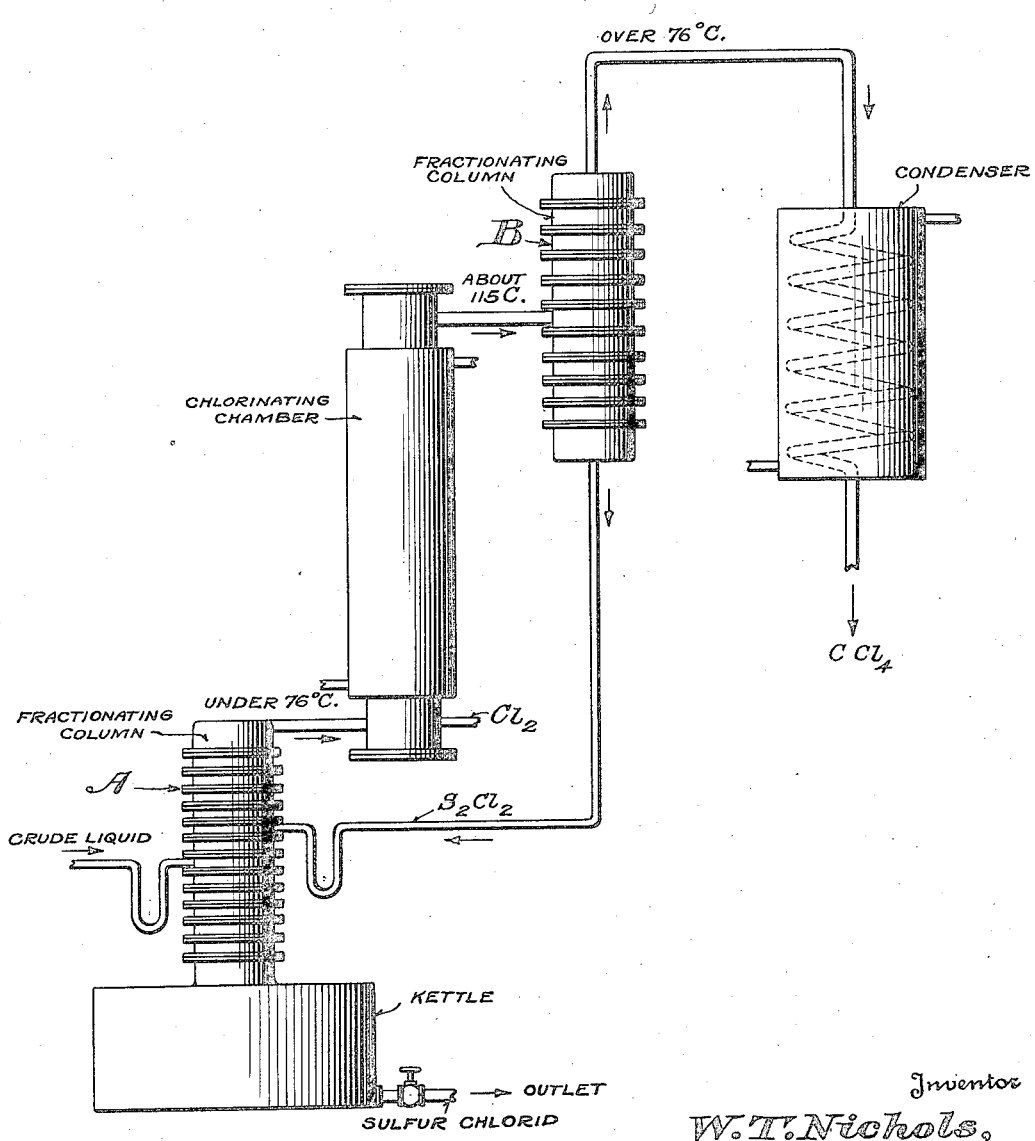

2,016,804

UNITED STATES PATENT OFFICE 2,016,804

PURIFICATION OF CARBON TETRACHLORIDE

William T. Nichols, Rahway, N. J., assignor to Westvaco Chlorine Products, Inc., New York, N. Y., a corporation of West Virginia Application December 7, 1933, Serial No. 701,403

9 Claims. (Cl. 260—166)

This invention relates to purification of carbon tetrachloride; and it comprises a process of purifying carbon tetrachloride wherein impure carbon tetrachloride containing carbon bisulfid is subjected to the action of chlorin while in the vapor phase, the treated vapors are condensed and the resultant purified carbon tetrachloride recovered; all as more fully hereinafter set forth and as claimed.

In the usual method of manufacture, carbon tetrachloride is produced by chlorination of liquid carbon bisulfid. The operation ends when chlorination of carbon bisulfid reaches an economical limit. At this time, the product consists essentially of a mixture of carbon tetrachloride and sulfur chlorid with some residual carbon bisulfid. According to ordinary practice, the foregoing mixture is subjected to fractional distillation; the final product consisting of carbon tetrachloride containing traces of residual carbon bisulfid as impurity. This residual carbon bisulfid is small in amount but objectionable. It is hard to remove by fractional distillation. Nor can it readily be removed by chlorinating the liquid.

I have found, however, that this residual carbon bisulfid may be readily removed by subjecting the impure carbon tetrachloride in vapor form to the action of a small amount of chlorin. The action takes place readily when chlorin is sent into the forerunnings in distilling carbon tetrachloride, since the bisulfid accumulates in the first portion of vapor formed. In the distillation of crude carbon tetrachloride containing sulfur chlorid and less than 0.1 per cent of carbon bisulfid, it is good practice to introduce a little chlorin into the still; the amount for example being about 0.25 lbs. per 100 lbs. of distillate. The proportion varies somewhat with the rate of distillation as well as with the carbon bisulfid content of the crude material. With a still delivering, say, 400 lbs. of distillate per hour, it has been found effective to introduce about a pound of chlorin per hour in the still. Chlorin goes forward with the distilled vapors and reacts with carbon bisulfid in the vapor phase, converting it to carbon tetrachloride and sulfur chlorid.

The present invention may be applied to crude carbon tetrachloride being separated from sulfur chlorid in a column still or rectifying column. In the column at a short distance above the base there will be a certain amount of sulfur chlorid, the rest of the vapors consisting of carbon tetrachloride and some CS₂. If chlorin be introduced at this point the CS₂ disappears with formation of a corresponding amount of sulfur chlorid which goes back to the base of the column with the other sulfur chlorid, the CCl₄ also formed going forward. In doing this a charge of catalytic material may be placed in the column at the point of chlorid introduction. As stated, it is good practice to introduce a little chlorin into the still during rectification of crude carbon tetrachloride. In the manner of operation just described, the point of chlorin introduction is merely changed somewhat, the chlorin being introduced into the vapors above the still rather than into the still itself. The new carbon tetrachloride vapor goes forward with the main body to a condenser; the sulfur chlorid formed by the action of the chlorin being refluxed. The desired result is not dependent on the use of catalysts and may be brought about by merely introducing chlorin into the vapor of the carbon tetrachloride to be purified. However, the use of a contact mass is advantageous.

In one embodiment of my invention, vapors of carbon tetrachloride containing residual carbon bisulfid are mixed with chlorin gas and the mixture is passed through a heat insulated tube packed with glass beads. The beads give a turbulent flow and intermixture and accelerate chlorination of the bisulfid.

I generally, however, find it advantageous to conduct the chlorination in the presence of a granular mass of an active catalyst, such as iron, copper, antimony or anhydrous ferric chlorid. Iron turnings are suitable.

The ordinary method for purifying carbon tetrachloride by distillation and fractionation may be modified by inclusion of the present method of purification. In so doing, a charge of a crude mixture of carbon tetrachloride and sulfur chlorid with residual carbon bisulfid is placed in a still having a fractionating head or column and the still run for a time as a refluxing device. This causes an accumulation of carbon bisulfid in the head and chlorin may be introduced in a special chamber or tube through which vapors from the head are passed. Or, mixed carbon tetrachloride and bisulfid vapors may be sent over as forerunnings in the usual way and introduction of chlorin begun in a heated reaction chamber packed with a granular contact mass or catalyst. The chamber is provided with an inlet for chlorin at the same end as the vapor inlet. At the opposite end is provided an outlet conduit for the vapor mixture leading to a condenser. For refluxing, this may in turn be connected with the top of the fractionating column through a liquid seal. It is advantageous to steam jacket the reaction chamber so as to heat the mixture somewhat during chlorination. Instead of a steam jacket, simple insulation with asbestos paper or 85 per cent magnesia may serve the purpose, sufficient heat being carried forward in the vapor mixture. The amount of heat developed depends upon the proportion of bisulfid present.

In operation, I apply heat to the charged still and the desired distillation equilibrium is set up. Vapors pass up into the fractionating column where they are subjected to fractionation. At the beginning of the distillation the lower boiling materials concentrate in the fractionating column and the temperature of the vapor leaving the column is, therefore, usually lower than the boiling point of carbon tetrachloride. The lower boiling fraction consists mainly of carbon bisulfid, and on leaving the column and passing through the reaction chamber the bisulfid is subjected to the action of chlorin in the chamber and converted into carbon tetrachloride and sulfur chlorid. This mixture passes through the condenser and is returned to the fractionating column as reflux liquid. The reflux of the condensate continues until the temperature of the vapor leaving the top of the column rises and becomes substantially constant at approximately the boiling point of carbon tetrachloride, at which time, as I have found, the vapor is free of carbon bisulfid and the condensate is substantially free of sulfur chlorid. When the condensed carbon tetrachloride shows desired freedom from sulfur chlorid the condensate is permitted to flow to storage from the condenser.

In practice of the process as outlined I ordinarily use steam at less than ten pounds gauge pressure in the jacket of the reaction chamber to keep the reaction in the vapor phase, but steam pressures as high as 150 pounds gauge have been used in the jacket with consequent higher reaction temperatures. It may therefore be seen that the temperature of the mixture passing through the reaction chamber can be varied within wide limits while chlorination is taking place.

Operation of the process may be made continuous by using two fractionating columns with a chlorinating chamber interposed between the two columns. The first column, provided with a heating kettle is fed continuously with the crude mixture to be purified and from the top of the column the vapors of carbon tetrachloride and carbon bisulfid are passed through the chlorinating chamber into the second column. Sulfur chlorid formed in the chlorinating reaction is separated from the carbon tetrachloride vapor in the second column and refluxed to the first column. Carbon tetrachloride vapor now free of bisulfid and of sulfur chlorid goes forward from the second column to a condenser. In a variation of this continuous method of operation, a single fractionating column provided with an impervious septum at a suitable level may be used. Vapors of tetrachloride and bisulfid are bypassed from below the septum through a chlorinating chamber and back to the column above the septum, a heat interchange being arranged for the vapors going to and from the chlorinator, that is, from and to the column. Liquid sulfur chlorid collects above the septum and is trapped back to the column below the septum.

The above description of a general commercial process embodying my new method of purification is given by way of illustrating the utility of the invention. Obviously, various factors in the process are variable. Depending upon the amount of carbon bisulfid to be removed, the dimensions of the reaction chamber, the rate of distillation and the proportion of sulfur chlorid present, I may regulate the operation to deliver a condensate free of carbon bisulfid, or one having a desired lower carbon bisulfid content than the untreated material.

Another commercial application of my invention is in the purification of technical grades of carbon tetrachloride containing carbon bisulfid as an impurity with little or no sulfur chlorid. Such material is purified by distillation and treatment of the vapors with chlorin in a manner similar to that just described. However, it is obviously more economical where possible to incorporate the purification step in the process of manufacture of the carbon tetrachloride. In either event, carbon tetrachloride after having been subjected to vapor phase chlorination as described and after having been passed through the usual lime wash and subsequent steam distillation, as I have found, can be made of C. P. grade.

In the accompanying drawings I have shown more or less diagrammatically organizations of apparatus elements useful in the performance of the described process. In this showing, Fig. 1 is a diagrammatic elevational view constituting a flow sheet of one embodiment of the process;

Fig. 2 is a view in vertical section of the chlorinating chamber of Fig. 1; and

Fig. 3 is a diagrammatic elevational view of apparatus for a modified embodiment of the process.

Referring to Fig. 1, a still 1 of ordinary type is provided with a valved conduit 1a through which the crude carbon tetrachloride can be introduced into the still. Another valved conduit 1b may serve to remove high boiling residues (sulfur chlorid) from the still. The still is heated by suitable means (not shown) and the introduced crude liquid carbon tetrachloride is boiled. The vapor passes from the still into a fractionating column 2 where the high boiling constituents are condensed and refluxed. The low boiling constituents consisting principally of carbon tetrachloride and carbon bisulfid vapors pass into a vapor line 4, a thermometer or other temperature indicating device 3 being placed at the top of the column. The vapor line delivers into a chlorinating chamber 5 near the bottom and chlorin gas in proper amount is introduced near the bottom of chamber 5 through a conduit 6 to mix with the vapor from the line 4. The mixed vapors pass upward through the chlorinating chamber and out through a pipe 7 into a condenser 8 of suitable design. In the chlorinating chamber chlorin reacts with the carbon bisulfid in the vapor phase and converts it to sulfur chlorid and carbon tetrachloride which pass forward to the condenser. The condensate flows from the condenser through a pipe 9 into a trap 27 and overflows from the trap through a pipe 10 into a flow meter 11. From the flow meter the condensate flows through a pipe 12 into a dividing box 13 from which the liquid may flow back to the fractionating column 2 through a seal leg 14 and pipe 15. From the dividing box 13 a liquid line 16, provided with a valve 17, runs to storage tank 18. The dividing box is so constructed that any desired proportion of the condensate may be allowed to flow back to the column as reflux, or by closing valve 17 all the condensate may be sent back to the column.

A suitable vent 19 is provided in line 9 running from the condenser in order to remove fixed gases from the condensate. A vent line 21 with connections 20 and 22 running from the dividing box and the flow meter respectively is connected into vent 19. The storage tank 18 is also provided with a gas vent 23.

The chlorinating chamber 5, as shown in Fig. 2, comprises a jacketed inner chamber 28 flanged at both ends to form an enclosed space, the vapor line 4 and chlorin conduit 6 being connected into the bottom of chamber 28. Chamber 28 is packed with a granular contact mass or catalyst 26. As stated, iron turnings have been found to act advantageously as the contact mass or catalyst accelerating the chlorination. As shown, a jacket 29 encloses the chamber 28. Inlet and outlet pipes 24 and 25 are provided for passing a heating fluid, such as steam or hot water, through the jacket 29.

In practice, I have found that the process is readily controlled in accordance with the temperature shown by the thermometer 3 at the top of the fractionating column. When a crude liquid containing carbon bisulfid chlorid, carbon tetrachloride and residual carbon bisulfid is charged into the still and heated, vapors of carbon tetrachloride and carbon bisulfid pass off from the top of the fractionating column. At first, the temperature shown by thermometer 3 is below the boiling point of carbon tetrachloride because of the presence of carbon bisulfid. In the chlorinating chamber carbon bisulfid reacts with chlorin to form carbon tetrachloride and sulfur chlorid and the condensate formed in condenser 8 contains sulfur chlorid. As the action proceeds with reflux of the condensate to the fractionating column, the temperature at the top of the column gradually rises until it becomes practically constant at or about the boiling point of carbon tetrachloride or about 76° C. By this time all of the carbon bisulfid in the original liquid has been removed and the condensate is substantially free of carbon bisulfid and also sulfur chlorid. The condensate then consists of substantially pure carbon tetrachloride and this is recovered by directing the condensate into the storage tank 18. The still can then be charged with a further quantity of crude liquid to be purified. High boiling constituents such as sulfur chlorid which have been separated may be withdrawn from the still through valved conduit 1b before fresh quantities of the crude liquid are introduced.

In the process as carried on in the apparatus of Fig. 3, the crude carbon tetrachloride liquid which may carry a substantial proportion of admixed sulfur chlorid and some carbon bisulfid is continuously fed into a fractionating column A which is arranged to be heated by vapors rising from a heated kettle at the base of the column. Vapors at a temperature somewhat under the boiling point of carbon tetrachloride, 76° C., pass from the top of the column through a chlorinating chamber with chlorin introduced into the vapors at the top of the chamber. The chlorinating chamber is best heated by a steam jacket under superatmospheric pressure and the chlorinating chamber may contain a catalyst accelerating the reaction between CS₂ and chlorin forming sulfur chlorid and carbon tetrachloride. The temperature of the mixed vapors leaving the top of the chlorinating chamber may be, for example, about 115° C. The mixed vapors of carbon tetrachloride and sulfur chlorid enter a second fractionating column B. The column may be air cooled or water cooled in well known ways. In this second column sulfur chlorid is condensed to a liquid and refluxed through a suitable pipe to the fractionating column A where it joins the sulfur chlorid separated from the crude liquid to pass downward to the kettle from which it may be withdrawn through a suitable outlet. From the top of fractionating column B, where a temperature somewhat about 76° C. is maintained, carbon tetrachloride vapor passes to a condenser where it is condensed to a liquid. From the condenser purified liquid carbon tetrachloride flows to be packed for shipment or use. The process is continuous.

What I claim is:—

1. A process of purifying carbon tetrachloride containing carbon bisulfid as an impurity which comprises subjecting said impure carbon tetrachloride while in the vapor phase to the action of chlorin reacting with the CS₂ impurity to form carbon tetrachloride, condensing the treated vapors and recovering carbon tetrachloride from the condensate.

2. The process of claim 1 wherein said carbon tetrachloride is subjected to the action of chlorin in the presence of a chlorination catalyst.

3. In purifying crude carbon tetrachloride mixed with sulfur chlorid and containing carbon bisulfid, a process which comprises fractionally distilling said mixture so as to separate a fraction containing mixed vapors of carbon tetrachloride and carbon bisulfide, treating the mixed vapors with chlorin and recovering purified liquid carbon tetrachloride from the treated vapors.

4. In the process of claim 3, treating the vapors with chlorin in the presence of a chlorination catalyst.

5. In the purification of crude carbon tetrachloride containing carbon bisulfid as an impurity, a process which comprises vaporizing said crude carbon tetrachloride, introducing the vapors into a fractionating column and fractionating them therein, removing low boiling vapors from a high point in the column into a chlorinating chamber, subjecting said low boiling vapors while in said chamber to the action of chlorin, removing the treated vapors from said chamber and condensing them and recovering carbon tetrachloride from the condensate.

6. In the process of claim 5, accelerating the action of the chlorin upon the carbon bisulfid by means of a chlorination catalyst placed in the chlorinating chamber.

7. In the manufacture of carbon tetrachloride by chlorination of liquid carbon bisulfid to form a liquid mixture of carbon tetrachloride and sulfur chlorid containing residual carbon bisulfid, a process of obtaining purified carbon tetrachloride which comprises distilling said liquid mixture through a fractionating column, treating the low boiling vapors separated in the column with chlorin gas, refluxing liquid sulfur chlorid and condensing carbon tetrachloride from the low boiling vapors.

8. In the purification of crude carbon tetrachloride containing carbon bisulfid as an impurity, a process which comprises distilling said crude carbon tetrachloride, passing the vapors of distillation into a fractionating column and fractionating them therein, removing low boiling vapors from a high point in the column into a chlorinating chamber, subjecting said low boiling vapors while in said chamber to the action of chlorin, removing the treated vapors from said chamber and condensing them, returning the condensate to said fractionating column as reflux liquid until the temperature in the fractionating column at the point of removal of the vapors approximates the boiling point of pure carbon tetrachloride and thereafter removing and recovering said condensate as a purified product.

9. In the purification of crude liquid carbon tetrachloride containing carbon bisulfid as an impurity, a continuous process which comprises fractionally distilling said crude liquid in a fractionating column, passing the low boiling vapors from said column through a heated chlorinating chamber, subjecting said vapors in said chamber to the action of chlorin reacting with the carbon bisulfid impurity to form tetrachloride, passing the vapors into a second fractionating column, refluxing a liquid fraction from the second column to the first and condensing the low boiling vapor from the second column as purified carbon tetrachloride.

WILLIAM T. NICHOLS.